March 17, 1925.                                                    1,529,726
                        G. A. STIFEL, JR
                       RADIO PLAYING CARD
                       Filed Aug. 8, 1924          2 Sheets-Sheet 1

INVENTOR:
Gustav A. Stifel Jr.
BY
Walter A. Knight
ATTORNEY.

March 17, 1925.

G. A. STIFEL, JR

RADIO PLAYING CARD

Filed Aug. 8, 1924

1,529,726

2 Sheets-Sheet 2

410 w¹  500 w
2
CFCJ
QUEBEC, QUE.

365 w¹  1000 w
3
2LO
LONDON, ENG.

400 w¹  500 w
3
CCI
SANTIAGO, CHILI.

210 w¹  1000 w
4
JCS
TOKYO, JAPAN 209 w¹  500 w
5
WTM
POLAR EXPEDITION
DONALD McMILLAN
1924

CLASS A
SUPER-HETERODYNE RECEIVER

CLASS B
GREBE RECEIVER

AMPLIFIER

STATIC

*INVENTOR:*
Gustav A. Stifel Jr.
BY Walter A. Knight
*ATTORNEY.*

Patented Mar. 17, 1925.

1,529,726

UNITED STATES PATENT OFFICE.

GUSTAV A. STIFEL, JR., OF CINCINNATI, OHIO.

RADIO PLAYING CARD.

Application filed August 8, 1924. Serial No. 730,864.

*To all whom it may concern:*

Be it known that I, GUSTAV A. STIFEL, Jr., a citizen of the United States, residing at Cincinnati, in the county of Hamilton and State of Ohio, have invented new and useful Improvements in Radio Playing Cards, of which the following is a specification.

My invention relates to packs of playing cards relating to radio broadcasting stations, their location and equipment, apparatus for receiving radio signals, etc. in so far as these affect the reception of radio signals; and to games that may be played with all or a part of said cards.

The principal object of my invention is amusement; but much useful information concerning radio and incidentally geography can be learned from playing games with these cards.

Figure 20:
Figure 21:
Figure 22:
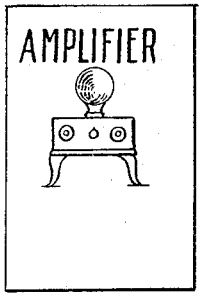
Figure 23:
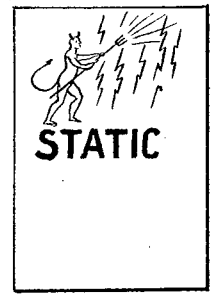

Typical cards are illustrated in the accompanying drawings:

Figures 1 to 19 representing radio broadcasting stations having varying wave lengths and wattage, said cards having varying values, Figures 20 and 21 representing radio receiving sets of different classes, Figure 22 representing an amplifier adapted to be used with a receiving set of either class, and Figure 23 representing the interference to reception caused by static.

Referring now to the drawings, a convenient pack of these cards may consist of 86 cards, altho packs of various numbers of cards and many different assortments may be used.

For a pack of 86 cards I prefer to have 64 cards representing broadcasting stations located all over the world. Of these 44 represent domestic stations, such as those represented by Figs. 1 to 13, and to each of these I have given an arbitrary value of one; 8 represent broadcasting stations in contiguous territory such as Canada, Cuba, Mexico and Hawaii; such as those represented by Figs. 14 and 15 and to each of these I have given an arbitrary value of two; 12 represent broadcasting stations at more distant points such as those represented by Figs. 16 to 19 and to these I have assigned arbitrary values ranging from three to five each. The intention is to increase the value in proportion to the distance and difficulty encountered in reception.

In the size pack mentioned I use 17 cards representing receiving sets of different capacity. Of these, I have made 5 class A, representing very powerful long range receiving sets, and 12 class B of less capacity. These may be given fanciful names or those of sets on the market.

There are also 4 amplifier cards, which when used in conjunction with receiving sets increase their capacity to receive radio signals.

There is also a static card which has the effect of diminishing the capacity of any radio receiving set.

Referring again to the cards representing broadcasting stations, it will be observed that at the top of these cards are two sets of notations those at the left indicating the wave length used by this station and those at the right the wattage. These may be fanciful but I prefer to make them actual. Immediately below the wave length notation is a figure indicating the value of the card when playing. The large letters are the station's call and immediately below this is the location of the station.

Figure 1:
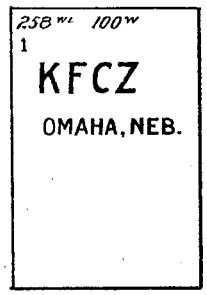
Figure 2:
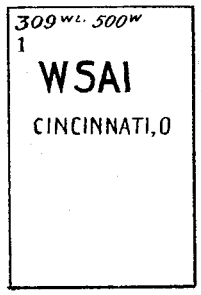
Figure 3:
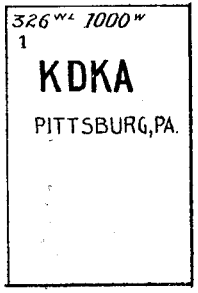
Figure 4:
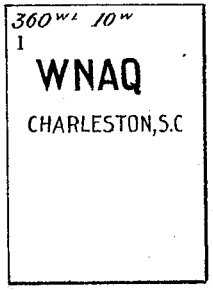
Figure 5:
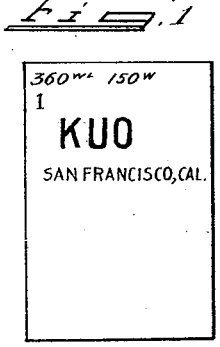
Figure 6:
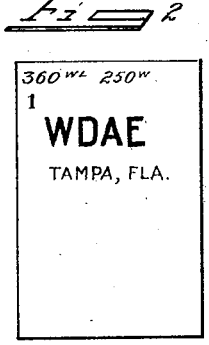
Figure 7:
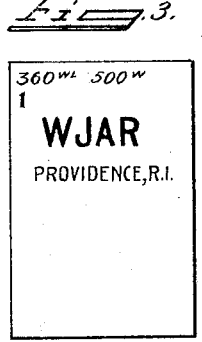
Figure 8:
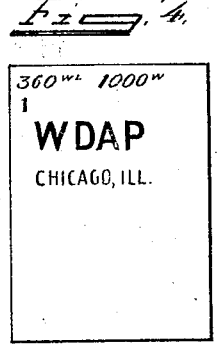
Figure 9:
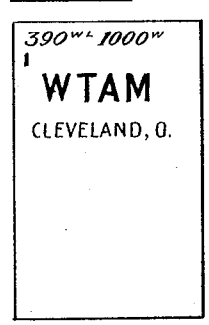
Figure 10:
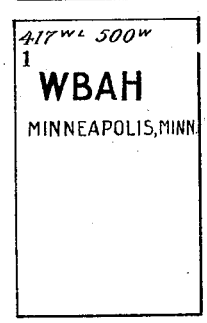
Figure 11:
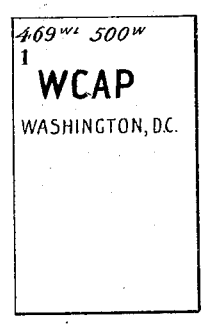
Figure 12:
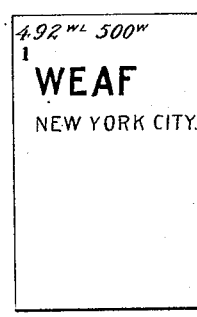
Figure 13:
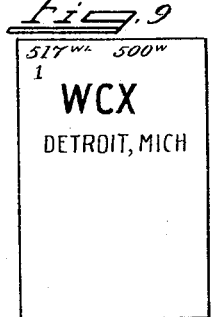
Figure 14:
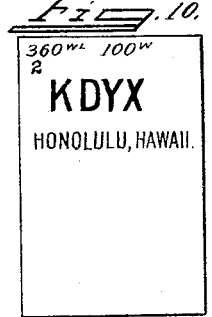
Figure 15:
Figure 16:
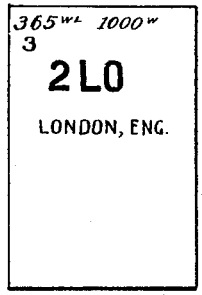
Figure 17:
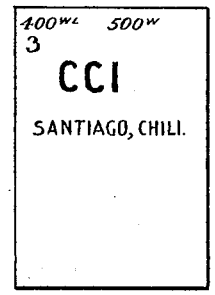
Figure 18:
Figure 19:
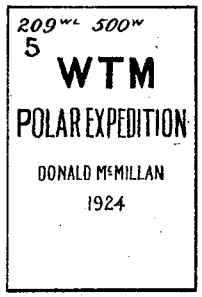

Reading Fig. 2 not in the order of the matter found thereon but as it would ordinarily be read; one would say, "Station WSAI, United States Playing Card Company, Cincinnati, Ohio, value 1, wave length 309 meters, 500 watts." The reading of the others will be apparent. The name of the station may be printed on the card as well as the call, but this is not necessary in playing many games with these cards. Many persons are now familiar with the names of practically all domestic broadcasting stations, so it is thought the printing of the names is superfluous.

A description of one of the games that may be played with these cards is as follows:

Rules.

(1) Class B receivers when used alone will take cards representing any two broadcasting stations having a value of 1, provided their watt power is 500 or more, but will take no others.

(2) Class A receivers when used alone will take cards representing any three broadcasting stations having a value of 1 or 2, regardless of watt power, but will take no others.

(3) No two stations having the same wave lengths can be included in the same combination with either class A or class B receiver. Broadcasting station cards of the same wave length may be held in the same hand, but cannot be used in combination with the same receiver card.

(4) Amplifier cards have no scoring value, but merely increase the range or taking power of either class receiver. An amplifier can be used with but one receiver at a time, and has no effect on other receivers held in the same hand.

(4ª) One amplifier combined with a Class A receiver will enable the latter to take twice its normal number (that is 6) broadcasting stations, no matter what their value, provided of course that they are of different wave lengths.

(4ᵇ) Two amplifiers combined with a Class A receiver will enable the latter to take three times its normal number (that is 9) broadcasting stations; no matter what their value. Not more than two amplifiers can be used with one Class A receiver card.

(4ᶜ) One amplifier combined with a Class B receiver will enable the latter to take twice its normal number (that is 4) broadcasting stations, and cards having a value of 2 may be taken as well as those having a value of 1, and those having less than 500 watt power, but all four of the cards must be of different wave lengths. Broadcasting station cards having a value of 3 or more cannot be so taken.

(4ᵈ) Two amplifiers combined with a Class B receiver will enable the latter to take thrice its normal number (that is 6) of any value. This combination of a Class B receiver and two amplifiers has just the same receiving capacity, that is power to take broadcasting station cards as Class A with one amplifier.

(4ᵉ) Three amplifiers with a Class B receiver will increase the latter's capacity four times (that is to 8 cards). This is similar to a Class A receiver with two amplifiers, only that combination takes 9 cards instead of 8. Not more than three amplifiers may be used with one Class B receiver.

(5) If a player has an unused amplifier card in his hand, he must discard it and if an unused amplifier card is found in his hand when the count is taken at the end of the game, his score is zero.

(6) In scoring, each player is allowed the total of all the values of his broadcasting station cards if properly matched with receiver cards according to the rules.

(7) The static card has no scoring value. Its effect to reduce to one half the scoring value of the hand in which it is found at the end of the game; excepting stations of 1000 watts, which have their scoring value doubled.

Hands and method of playing.

The game is preferably played by four persons, but more or less may play at one time. The dealer shuffles the cards, the one on his right cuts them and he deals to the left, one card at a time till each player has 12 cards, all of which have been dealt face down. The remaining cards are placed face down on the table, and in the order the cards were dealt, each player draws a card from the top of the deck. He then selects one card and discards it face up on the table. The next player may draw from either pile, and discards in the same manner as the first player. Players may draw only the last card discarded, if they draw from the discard pile.

How game is ended and scoring.

Whenever any player has a completed hand, that is, has the full number of proper broadcasting station cards to match his receiver cards, so that all twelve cards are combined excepting of course the static card, he calls the game. Thereupon, all players show their hands, and the count is taken. The player calling the game is allowed 5 points in addition to the value of the cards in his hand. For example: A hand containing a Class A receiver and two amplifiers with nine stations of any value and all of different wave lengths would be a perfect combination enabling its holder to call the game; also a hand consisting of a Class B receiver and 3 amplifiers with 8 stations of different wave lengths; also a hand consisting of four Class B receivers each with station cards value 1, the cards of each such pair of different wave lengths. Uncombined station cards are not counted in scoring.

If no one is able to call the game, it ends when the last card is drawn from the face down stack.

Obviously many changes may be made in the assortment of cards, and an almost infinite variety of games may be played with them without departing from the spirit of my invention, and I claim as within the scope of my invention all forms herein covered by the claims.

I claim as my invention and desire to secure by Letters Patent of the United States:

1. A pack of playing cards comprising an assortment representing broadcasting stations, receiving sets and amplifiers.

2. A pack of playing cards comprising a plurality of those representing broadcasting stations, a plurality of those representing receiving sets and a plurality of those representing amplifiers.

3. A pack of playing cards comprising a plurality of those representing broadcasting stations, a plurality of those representing receiving sets, a plurality of those representing amplifiers and a card representing static.

4. A pack of cards comprising an assortment representing broadcasting stations, receiving sets of different ranges and amplifiers.

5. A pack of cards comprising an assortment representing broadcasting stations, receiving sets of different ranges, amplifiers and static.

6. A pack of playing cards comprising a plurality of those representing broadcasting stations operating different wave lengths and having different wattage.

7. A pack of playing cards comprising a plurality of those representing broadcasting stations operating different wave lengths, having different wattage and static.

8. A pack of playing cards comprising cards representing broadcasting stations of different radio characteristics, cards representing receiving sets of different radio characteristics, cards representing amplifiers to be used with the receiving sets and a card representing static, all said cards together adapted to illustrate in a general way the difficulties encountered in radio reception.

In testimony whereof I have hereunto set my hand.

GUSTAV A. STIFEL, Jr.